2,988,423
WET PRODUCTION OF SILICATES
George R. McDaniel, Painesville, Ohio, assignor to Diamond Alkali Company, Cleveland, Ohio, a corporation of Delaware
No Drawing. Filed Oct. 30, 1957, Ser. No. 693,254
6 Claims. (Cl. 23—110)

This invention relates to a method of producing alkali metal silicates, and more particularly relates to a method of producing alkali metal silicates by the reaction of an aqueous solution of an alkali metal carbonate and silica.

The alkali metal silicates, and in particular sodium silicate, have found extensive uses in a widely varied number of industries. They are especially useful as adhesives for corrugated and fiber boxes, paperboard, and wood veneer, such as plywood. They are also useful as refractory cements for furnaces and boilers. These compounds find further application in sizing for paper and paper products. Another area in which these silicates are widely used is in the manufacture of soap and detergents, these latter compounds finding extensive use in the laundry industry, the dairy industry, and the metal cleaning industry.

At present, there are two principal commercial methods of preparing alkali metal silicates, and in particular sodium silicate. In the method most generally practiced, anhydrous alkali metal carbonate, as for example sodium carbonate, and silica, as for example silica sand, are fused at temperatures between 1300° and 1400° C. to produce the silicate. In the other notable commercial method, anhydrous alkali metal hydroxide, as for example sodium hydroxide, and silica, e.g., silica sand, are reacted at temperatures between 300° and 500° C. to produce the silicate. In the former method, the high temperatures required do not lend themselves to economical operation. In the latter method, the expensive reactant necessary, i.e., anhydrous alkali metal hydroxide, generally renders this method economically unattractive. The need for a method of synthesis of alkali metal silicates, notably sodium silicate, not limited by the above disabilities is therefore apparent.

It is therefore an object of this invention to provide a novel method of producing alkali metal silicates, and in particular sodium silicate, which method can be carried out at temperatures below 300° C.

A further object is to provide a process of producing alkali metal silicates, and in particular sodium silicate, which method utilizes alkali metal carbonates instead of anhydrous alkali metal hydroxides at economically low reaction temperatures.

These and other objects and advantages of this invention will become apparent to those skilled in the art from the description which follows.

It has now been found that by reacting an alkali metal carbonate, preferably sodium carbonate, and silica, notably silica sand, at a temperature above the boiling point of the reaction mixture at atmospheric pressure, and at a pressure above atmospheric pressure in an aqueous liquid medium, an alkali metal silicate advantageously is produced. This method, therefore, overcomes the disadvantages enumerated above, which are inherent in the two present commercial methods, i.e., an expensive reactant material and an uneconomically high reaction temperature.

Pursuant to the above objects, the present invention comprises the steps of mixing silica and an aqueous solution of alkali metal carbonate and subjecting the resulting mixture to a temperature greater than 100° C. and superatmospheric pressure until an aqueous solution of alkali metal silicate is formed. It is to be understood, that the term "alkali metal" compound as used throughout the specification and claims is intended to refer to the alkali metals broadly, i.e., sodium, potassium, lithium, rubidium, and cesium. However, because of their low cost and availability, sodium compounds are preferred and hence the invention has been described with particular emphasis on the use of these compounds.

In carrying the present invention into effect, a silica material, preferably silica sand, and an aqueous solution of an alkali metal carbonate, preferably sodium carbonate, are combined. The carbonate solution desirably contains from about 4% to about 45% carbonate by weight of the water with particularly good results being obtained when the carbonate solution contains about 20% to 25% carbonate by weight of water.

The principal reaction which takes place between the aqueous sodium carbonate and the silica is indicated generally in the following emperical chemical equation:

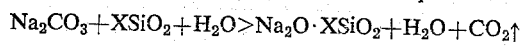

$$Na_2CO_3 + XSiO_2 + H_2O > Na_2O \cdot XSiO_2 + H_2O + CO_2\uparrow$$

where X is a number from 1 to 2.8, inclusive. At the temperature of the reaction, the carbonic acid immediately breaks down into water and carbon dioxide, the latter being removed during the reaction. It has been found that, at atmospheric pressure even when the sodium carbonate solution is boiling, the above reaction occurs very slowly if at all. However, in the practice of the present invention the reaction mixture of carbonate and silica is subjected to a pressure greater than atmospheric pressure, thus greatly reducing the time required for completing the reaction. Moreover, surprisingly, as the reaction pressure is increased, the silicate product has an increasingly higher $SiO_2:Na_2O$ ratio. Inasmuch as highly alkaline silicates, i.e., sodium silicates having a low $SiO_2:Na_2O$ ratio, are somewhat corrosive, thus making them undesirable for many uses, e.g., as adhesives, the ability of the present process to produce a low alkali silicate, i.e., a sodium silicate having a high $SiO_2:Na_2O$ ratio will be recognized as advantageous.

Although generally the present invention may be carried out at any pressure above atmospheric pressure and any temperature above the boiling point of the aqueous carbonate solution, it has been found that the preferred pressure range is about 65 to 300 pounds per square inch and the preferred temperature range is about 155° to 217° C. with especially good results being obtained when the pressure is from about 170 to 270 pounds per square inch and the temperature is within the range from about 190° to 212° C.

The amount of silica sand and carbonate may be varied to obtain a reaction mixture having a silica sand to sodium carbonate weight ratio, i.e., an $SiO_2:Na_2O$ ratio of from about 0.97 to 26:1. It has been found, however, to be virtually impossible to react all of the sodium carbonate with all of the silica sand. It is, therefore, desirable to use a reaction mixture which contains an excess of silica sand, so that all of the sodium carbonate will react, the unreacted sand easily being separated by sedimentation, filtration or centrifugation from the silicate which is formed in the reaction, while any unreacted sodium carbonate requires a much more complicated separation procedure. For this reason, the preferred reaction charge contains an excess of silica sand, i.e., silica sand and sodium carbonate in proportions to provide an $SiO_2:Na_2O$ weight ratio greater than 1:1, with especially good results being obtained when the reaction mixture embodies an $SiO_2:Na_2O$ weight ratio of from 3 to 13:1.

In carrying the present invention into effect, it generally is desirable to remove the carbon dioxide as it is formed, since otherwise the reaction tends quickly to reach a state of equilibrium. The water formed in the reaction is condensed, the $CO_2$ being non-condensable, is vented. Accordingly, since the reaction is carried out under superatmospheric pressure, it has been found to be more expedient to condense the water vapor when the $CO_2$ is removed and return it to the reactor rather than removing it with the $CO_2$. This may be satisfactorily accomplished by directing the vapor product of the reaction, i.e., the $CO_2$ and the water vapor, into a condenser wherein the water vapor is condensed and returned to the reactor, the $CO_2$ being released to the atmosphere or collected for reuse. The completion of the reaction is indicated when the amount of carbon dioxide given off is negligible. This generally occurs after 20 hours or more. However, it has been noted as the reaction progresses, the rate of reaction slows down. This is determined by measuring the amount of $CO_2$ evolved as the reaction progresses. For example, in one apparatus employed for practice of the method of the present invention, typical rate data is exemplified by the following table:

| Reaction time: | $CO_2$ evolved (Average), cc./min. |
|---|---|
| First 3 hours | 25 |
| Second 3 hours | 10 |
| Third 3 hours | 6 |
| 10th hour | 4 |
| 11th hour | 2 |

It has been found that by agitating the reaction mixture during the entire time of the reaction and by using a finely-divided silica material, as for example silica flour, i.e., a silica material having particles which will pass through a 100 mesh screen, the time for the above reaction is reduced to below 20 hours.

In order that those skilled in the art may better understand the present invention and in what manner the same may be carried into effect, the following specific examples are offered. It is understood that these examples are illustrative of the invention and are not intended to limit its scope in any manner.

In all of the examples, the apparatus used comprises a steel pressure reactor capable of withstanding pressures in excess of 300 pounds per square inch. A condenser, capable of withstanding similar pressures, is connected to the reactor, which condenser contains a needle valve whereby carbon dioxide formed during the reaction can be released as the water vapor is condensed and returned to the reactor. The reactor is heated by immersing it in a heated oil bath, open flame, or other suitable means.

*Example I*

100 gm. of silica sand, 178 gm. of sodium carbonate, and 800 gm. of water are placed in the pressure reactor. The resulting mixture has an $SiO_2:Na_2O$ molar ratio of 1:1. The charge is reacted for 62 hours at a pressure of 160 to 180 pounds per square inch and at a temperature of 188 to 193° C. At the end of this time, it is found that 53.4% of the sodium carbonate and 97% of the silica sand has reacted and the silicate product formed has an $Na_2O:SiO_2$ weight ratio of 1:1.84.

*Example II*

600 gm. of silica sand, 40 gm. of sodium carbonate, and 900 gm. of water are combined in the pressure reactor to make a reaction charge having an $SiO_2:Na_2O$ weight ratio of 26:1. This charge is reacted for 11 hours at a pressure of 220 to 270 pounds per square inch and a temperature of 202° to 212° C. During the reaction, the charge is agitated by rotating the reactor at a speed between 6 and 7 r.p.m. Upon analyzing the reaction product, it is found that 82.5% of the sodium carbonate had reacted with 5.2% of the silica sand and the reaction product has an $Na_2O:SiO_2$ weight ratio of 1:2.04.

*Example III*

600 gm. of silica sand, 240 gm. of sodium corbonate and 1200 gm. of water are combined in the pressure reactor to form a charge having an $SiO_2:Na_2O$ weight ratio of 4.31:1. This charge is reacted for 46 hours at a pressure of 230 to 260 pounds per square inch and a temperature of 202° to 212° C. Upon analyzing the reaction product, it is found that 98% of the soda ash and 39% of the silica sand has reacted and the silicate formed has an $Na_2O:SiO_2$ weight ratio of 1:2.35. In this example as in Example I no agitation is provided for the reaction charge, other than is afforded by rotation of the reactor at a speed of between 6 and 7 r.p.m.

*Example IV*

600 gm. of silica sand, 40 gm. of sodium carbonate, and 900 gm. of water are combined in the pressure reactor to make a reaction charge having an $SiO_2:Na_2O$ weight ratio of 26:1. This charge is reacted for 4 hours at a pressure of 220 to 270 pounds per square inch and a temperature of 202° to 212° C. An analysis of the reaction product shows that 46.5% of the sodium carbonate and 2.9% of the silica sand has reacted and the silicate product formed has an $Na_2O:SiO_2$ weight ratio of 1:2.10. As in Example II, the reaction charge is agitated during the reaction by rotating the reactor at a speed between 6 and 7 r.p.m.

An analysis of the silicate produced by the method of this invention reveals that after filtering, the silicates typically contain only about 0.049% by weight of the silicate of $Al_2O_3+Fe_2O_3$ impurities. A similar analysis of standard filtered commercial silicates prepared from the same materials, i.e., sodium carbonate and silica sand, but by the dry fusion method, reveals that these silicates contain about 0.15% by weight of $Al_2O_3+Fe_2O_3$ impurities, or roughly three times the impurities found in the silicate produced by the method of the subject invention. It has also been found that the carbon dioxide produced during the reaction has a moisture content of less than 3½%. Thus, after very little additional purification, it can be compressed and made ready for sale or reuse.

By using the method of the subject invention, a sodium silicate is produced under conditions which are less violent than those necessary in the present fusion process using sodium carbonate and sand. It also obviates the use of the more expensive sodium hydroxide as a reactant in the preparation of sodium silicate. In addition, one of the by-products of the reaction, carbon dioxide, is easily recovered and made ready for sale or use in the ammonia-soda process.

It is to be understood that, although the invention has been described with specific reference to particular embodiments thereof, it is not to be so limited, since changes and alterations therein may be made which are within the full intended scope of this invention as defined by the appended claims.

What is claimed is:

1. The method of making sodium silicate comprising combining silica sand and an aqueous solution of sodium carbonate in quantities sufficient to provide a mixture having an $SiO_2:Na_2O$ weight ratio of at least 1:1, reacting said mixture at a pressure within the range of about 65 to 270 pounds per square inch and at a temperature from about 155°–212° C. to produce carbon dioxide and an aqueous solution of sodium silicate, and continuously removing the carbon dioxide produced to maintain the desired pressure and permit the reaction to proceed to completion, said sodium silicate having an $Na_2O:SiO_2$ weight ratio of about 1:1 to about 1:2.8.

2. The method as claimed in claim 1 wherein the sodium silicate has an $Na_2O:SiO_2$ weight ratio of about 1:1.84, the pressure is from about 160 to 190 pounds per square inch and the temperature is from about 188° to 196° C.

3. The method as claimed in claim 1 wherein the sodium silicate has an $Na_2O:SiO_2$ weight ratio of about 1:2.04, the pressure is from about 210 to 270 pounds per square inch and the temperature is from about 200° to 212° C.

4. The method of making sodium silicate comprising combining silica sand and an aqueous solution of sodium carbonate in quantities sufficient to provide a mixture having an $SiO_2:Na_2O$ weight ratio of at least 4:1, reacting said mixture under a pressure from about 220 to 270 pounds per square inch in a temperature from about 202° to 212° C. to produce carbon dioxide and an aqueous solution of sodium silicate, and continuously removing the carbon dioxide produced to maintain the desired pressure and permit the reaction to proceed to completion, said sodium silicate having an $Na_2O:SiO_2$ weight ratio of about 1:2.35.

5. The method of making sodium silicate comprising combining silica sand and an aqueous solution of sodium carbonate in quantities sufficient to provide a mixture having an $SiO_2:Na_2O$ weight ratio of at least 13:1, reacting said mixture under a pressure from about 65 to 270 pounds per square inch and a temperature from about 155° to 212° C. to produce carbon dioxide and an aqueous solution of sodium silicate, and continuously removing the carbon dioxide produced to maintain the desired pressure and permit the reaction to proceed to completion, said sodium silicate having an $Na_2O:SiO_2$ weight ratio of about 1:2.0 to 1:2.8.

6. The method of making sodium silicate comprising combining silica sand and an aqueous solution of sodium carbonate in quantities sufficient to provide a mixture having an $SiO_2:Na_2O$ weight ratio of at least 26:1, reacting said mixture under a pressure from about 65 to 270 pounds per square inch and a temperature from about 155° to 212° C. to produce carbon dioxide and an aqueous solution of sodium silicate, and continuously removing the carbon dioxide produced to maintain the desired pressure and permit the reaction to proceed to completion, said sodium silicate having an $Na_2O:SiO_2$ weight ratio of about 1:2.0 to 1:2.8.

References Cited in the file of this patent

UNITED STATES PATENTS

| | | |
|---|---|---|
| Re. 1,674 | Van Derburgh | May 17, 1864 |
| 1,022,064 | Curtis | Apr. 2, 1912 |
| 2,219,646 | Beecher | Oct. 29, 1940 |
| 2,823,100 | Mockrin | Feb. 11, 1958 |

FOREIGN PATENTS

| | | |
|---|---|---|
| 543,907 | Canada | July 23, 1957 |
| 299,763 | Great Britain | Mar. 14, 1929 |